United States Patent [19]
Dechow

[11] Patent Number: 5,090,941
[45] Date of Patent: Feb. 25, 1992

[54] APPARATUS FOR FEEDING FISH PROCESSING MACHINES

[75] Inventor: Ulrich Dechow, Lübeck, Fed. Rep. of Germany

[73] Assignee: Nordischer Maschinenbau Rud.Baader GmbH + Co KG, Lubeck, Fed. Rep. of Germany

[21] Appl. No.: 678,435

[22] Filed: Apr. 1, 1991

[30] Foreign Application Priority Data

Apr. 6, 1990 [DE] Fed. Rep. of Germany ....... 4011177

[51] Int. Cl.⁵ .................. A22C 25/12; B65G 42/24
[52] U.S. Cl. .................... 452/183; 452/182; 452/181; 198/753
[58] Field of Search .......... 452/183, 182, 181; 198/793, 798

[56] References Cited

U.S. PATENT DOCUMENTS

| | | | |
|---|---|---|---|
| 1,030,646 | 6/1912 | Cleveland | 452/182 |
| 2,704,594 | 3/1955 | Gorby | 452/181 |
| 2,803,035 | 8/1957 | Bartels et al. | 452/181 |
| 3,077,632 | 2/1963 | Brandes et al. | 452/162 |
| 4,178,659 | 12/1979 | Simonds | 452/182 |
| 4,399,588 | 8/1983 | Molnar | 452/181 |
| 4,551,885 | 11/1985 | Molnar | 452/182 |
| 4,651,385 | 3/1987 | Persson | 452/181 |
| 4,825,510 | 5/1989 | Braeger | 452/162 |

*Primary Examiner*—Willis Little
*Attorney, Agent, or Firm*—Fay, Sharpe, Beall, Fagan, Minnich & McKee

[57] ABSTRACT

An apparatus for the timed feeding of fish into fish processing machines serves to supply such fish into a conveyor pushing them along in a direction transversal to their longitudinal axis and being provided with receiving troughs or entrainers. In order to be able to obtain the high performance non-mechanical feeding required in view of the high yield of modern processing machines while restricting as much as possible the physical stress on the staff responsible therefor, or to increase the non-mechanical performance without increasing the stress, a feeding apparatus is provided above the conveyor of the processing machine which apparatus includes a rotary entraining table or spider driven in synchronism with the conveyor. The entraining elements rotate about a fixed supporting surface and are attached tangentially to a hub so that the fish supplied to the thus formed chambers are charged with a pushing force or component effective in an inward or outward direction depending on the direction of rotation, which component effects a precise positioning of the fish by engagement of the mouth portion with a stop just before the transmitting to the conveyor occurs.

20 Claims, 2 Drawing Sheets

5,090,941

APPARATUS FOR FEEDING FISH PROCESSING MACHINES

BACKGROUND OF THE INVENTION

1. Field of the Invention

The invention relates to an apparatus for the timed feeding of fish into fish processing machines, in particular into conveying means of said machines, which conveying means are equipped with receiving troughs or entrainers and supply the fish to a processing station of said processing machines such as a decapitation device.

For processing fish, particularly large quantities of fish also called bulk fish, used predominantly are processing machines which process the fish with a semiautomatic or fully automatic procedure, in order to produce highly varied, marketable consumer products. In processing of this type, aside from the effort to increase the level of quality of the product, the economy of the productive processes plays a decisive roll. This has led to the presently common, high-performance feeding rate and yield or output for which the processing machines are designed, and to the proven concepts, which aim at automatic feeding of these machines. An apparatus of this type must also position the fish uniformly, because the processing machines to be fed usually require such uniform positioning of the fish. It is understandable that ensured function of such a process presupposes fish of perfect quality. This, however, is seldom present, so that manual feeding is still unavoidable.

2. Prior Art

Apparatus with certain elements of the subject matter of the invention are known from the prior art publications. E.g., an apparatus for positioning and supplying fish can be taken from DE 36 08 320 A1, in which a turntable is used followed by two essentially tangentially directed, oscillating advancing grooves. The grooves are arranged such that they advance the fish located therein with the head leading. Therefore, fish supplied into one of the grooves in a disorderly manner with regard to head-tail position are conveyed, according to head position, in both directions of the oscillation thrust, so that a number of the fish arrive at the turntable and are transferred to the other groove via a 180° turn.

Further, known from DE-GM 70 45 096 is a device for timed feeding of fish processing machines. There, a star feeder is used, which rotates about a horizontal axis and has radial, open pockets for receiving flat fish. The fish are inserted into the pockets with the tail end leading and leave these, following a rotation of the star feeder of 180°, with the head leading.

With these known concepts, it is not possible to achieve a sufficiently high level of feeding performance with such machines, which are intended for mass production.

3. Objects of the Invention

It is, therefore, the main object of the present invention to suggest an improved apparatus for obtaining the high performance non-mechanical (manual) feeding required in view of the high yield of modern processing machines.

It is a further highly important object of the invention to suggest an apparatus creating the least possible physical stress on the operating personnel and thus increase the non-mechanical performance without increasing the stress, respectively.

SUMMARY OF THE INVENTION

In an apparatus for the timed feeding of fish into fish processing machines comprising a conveyor equipped with receiving troughs or entrainers, these objects are acheived according to the present invention, in that the feeding apparatus is arranged above the conveyor and comprises a supporting surface for the fish, above which surface a rotary entraining table or spider is arranged driven to rotate about an axis perpendicular to the supporting surface and having entraining elements forming outwardly directed and sector-shaped chambers, and that the supporting surface has a cut-out in an area covering said conveyor, which cut-out is limited by an edge extending essentially in a radial direction with regard to the axis of rotation.

In such an arrangement, the entraining elements extend from a central hub body driven to rotate about the axis, the entraining elements forming tangents to said hub body.

The advantages which can be achieved in this manner consist particularly in that, although the fish must also be delivered positioned according to their head-tail as well as according to their belly-back position into this feeding device, simply a rough positioning is required, because the exact position necessary for processing is automatically adjusted and achieved, based, in fact, on the advancing force acting upon the fish, which force is created as a result of the revolution of the rotary entrainer table or spider in connection with the friction retaining the fish between the rotary entrainer table and the supporting surface.

A further relief of stress for the operating personnel consists in that the manual feeding can be performed in a sitting position, which is possible in a comfortable manner due to the freedom of leg movement beneath the feeding apparatus resulting from its plate-shaped design. Also, a proven advantage consists in that the supplied fish can be observed well until its transfer occurs and, if required, its position can be slightly corrected. And, because of the restricted size of the chambers, a kind of measuring means or self-reading ruler results for the fish to be processed which provides for timely recognition of possible oversizes.

According to a structurally advantageous embodiment of the invention the hub body may be designed to form a rectilinear and regular prism, and the entraining elements may be arranged such that they extend outwardly in planes defined by the side surfaces of the prismatic hub body.

According to its desired association with a fish processing machine the rotary entraining table can be driven to revolve in either one of the two possible directions of rotation, i.e. in a manner, respectively, that the revolving of the rotary entraining table occurs either such that a first face of each one of the entraining elements which is directed outwardly with regard to the centre of the rotary entraining table is leading or such that the revolving of the rotary entraining table occurs such that a second face of each one of said entraining elements which is directed inwardly with regard to the centre of the rotary entraining table is leading.

In the first case, the result is a displacement of the fish away from the centre of the rotary entraining table in an outward direction, whereas, in the second case, the fish are displaced in an inward direction towards the centre of the rotary entraining table.

In order to restrict the outward displacement of the fish, the chambers may be closed along their outer side by a bordering shoulder, which may preferably be arranged stationarily and may also be interrupted in the area of the cut-out within the supporting surface.

For the purpose of an advantageous transfer or delivery, the fish may further be aligned in a uniform position in that the entraining elements are each designed with a concave contour along their face engaging the fish in a pushing manner.

BRIEF DESCRIPTION OF THE DRAWINGS

Other and further objects of the present invention will be apparent from the following description and claims and from what is illustrated in the accompanying drawings which by way of illustration schematically show two preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
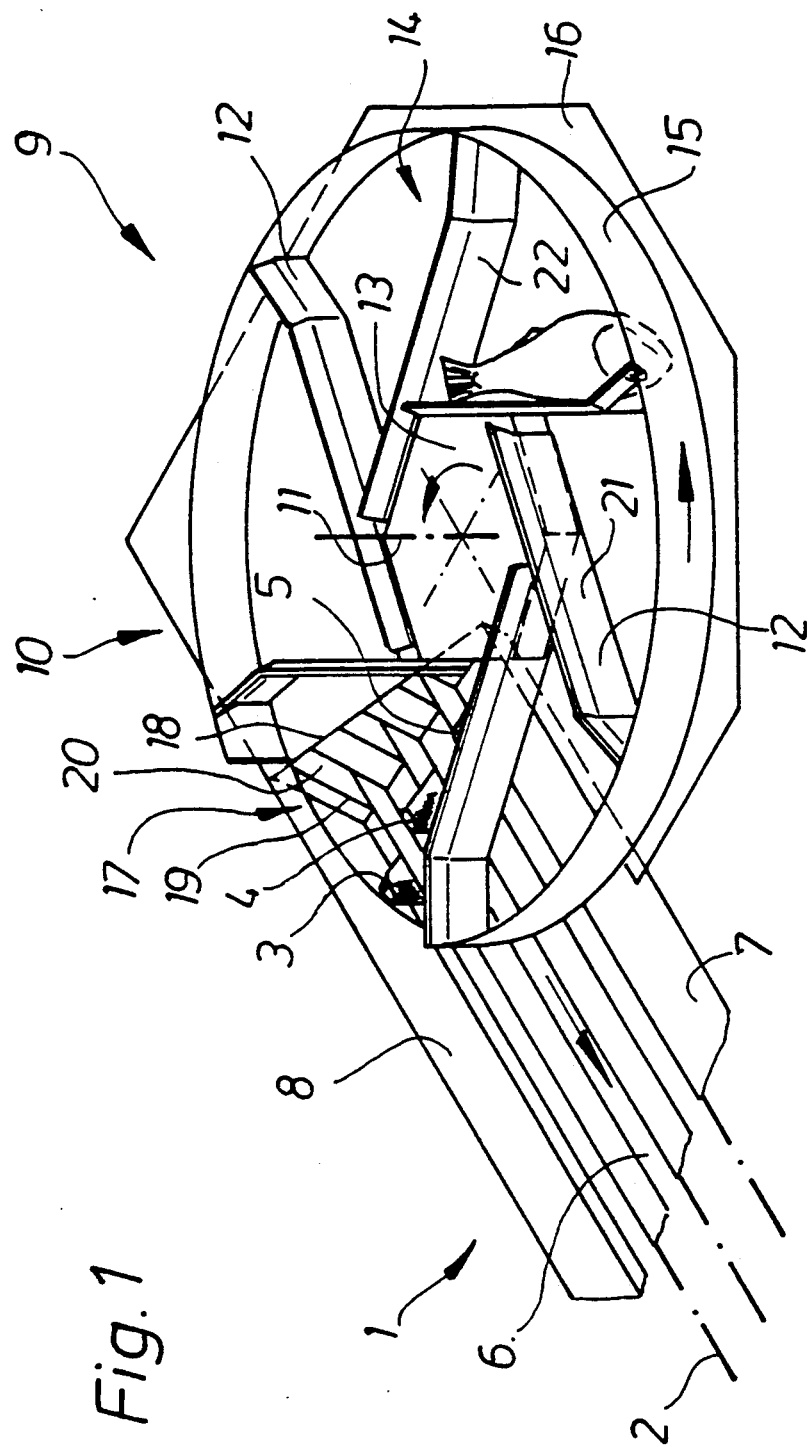
FIG. 1 shows an axonometric representation of one embodiment of the apparatus according to the invention in an arrangement above the conveyor of a fish processing machine.

In a frame of a decapitating machine 1 for fish, which frame has only been shown in a very intimated manner, there is provided a conveyor 2 which has been represented strongly simplified and is driven in an appropriate manner in the direction of the arrow. The conveyor 2 engages the fish from behind by their backs by means of entrainers 3, 4 and 5 and advances them transversely with regard to their longitudinal axis. The conveyor 2 is conventionally provided with further sets of entrainers which, for the sake of simplicity, have not been shown in detail, and which are spaced with regard to each other in the conveying direction that there is permitted a placing of a fish between neighbouring entrainer sets. The entrainers 3, 4 and 5 emerge through slots 6 in a supporting face 7, on which the fish lie during their conveyance and which along its border lying on a lower level has an outwardly projecting engaging shoulder 8 for engaging and supporting the fish by their mouth area.

As shown in FIG. 1, a feeding apparatus 9 is arranged above the conveyor 2. The feeding apparatus 9 comprises a rotary entraining table, or entraining spider 10 which is driven to rotate about a vertical axis 11 at a rotary speed which essentially corresponds to the speed of advancing of the conveyor 2. The rotary entraining table 10 comprises entraining elements 12 which are attached tangentially to a hub body 13 arranged concentrically with the axis 11 and having the shape of a rectilinear and regular prism. The entraining elements 12 extend outwardly which results in substantially triangular-shaped chambers 14 between two neighbouring entraining elements 12, respectively. The rotary entraining table 10 rotates above a supporting surface 16 without engaging this, which surface is provided with a cut-out 17 in an area above the conveyor 2. This cut-out is restricted by an edge 18 extending transversally with regard to the direction of movement of the conveyor 2. An apron 19 extends from the edge 18 down to the supporting face 7, which apron 19 is provided with apertures 20 for allowing the free passage of the entrainers 3, 4 and 5.

The rotary entraining table 10 rotates inside of a bordering shoulder 15 built on the supporting surface 16 without contacting this shoulder, either, the latter being interrupted in the region of the cut-out 17 of the supporting surface 16. The revolving of the rotary entraining table 10 occurs anti-clockwise, and the arrangement of the feeding apparatus 9 with regard to the decapitating machine is such that the bordering shoulder 15 substantially lies flush with the engaging shoulder 8 in the area of the edge 18 of the cut-out 17 within the supporting surface 16.

Figure 2:
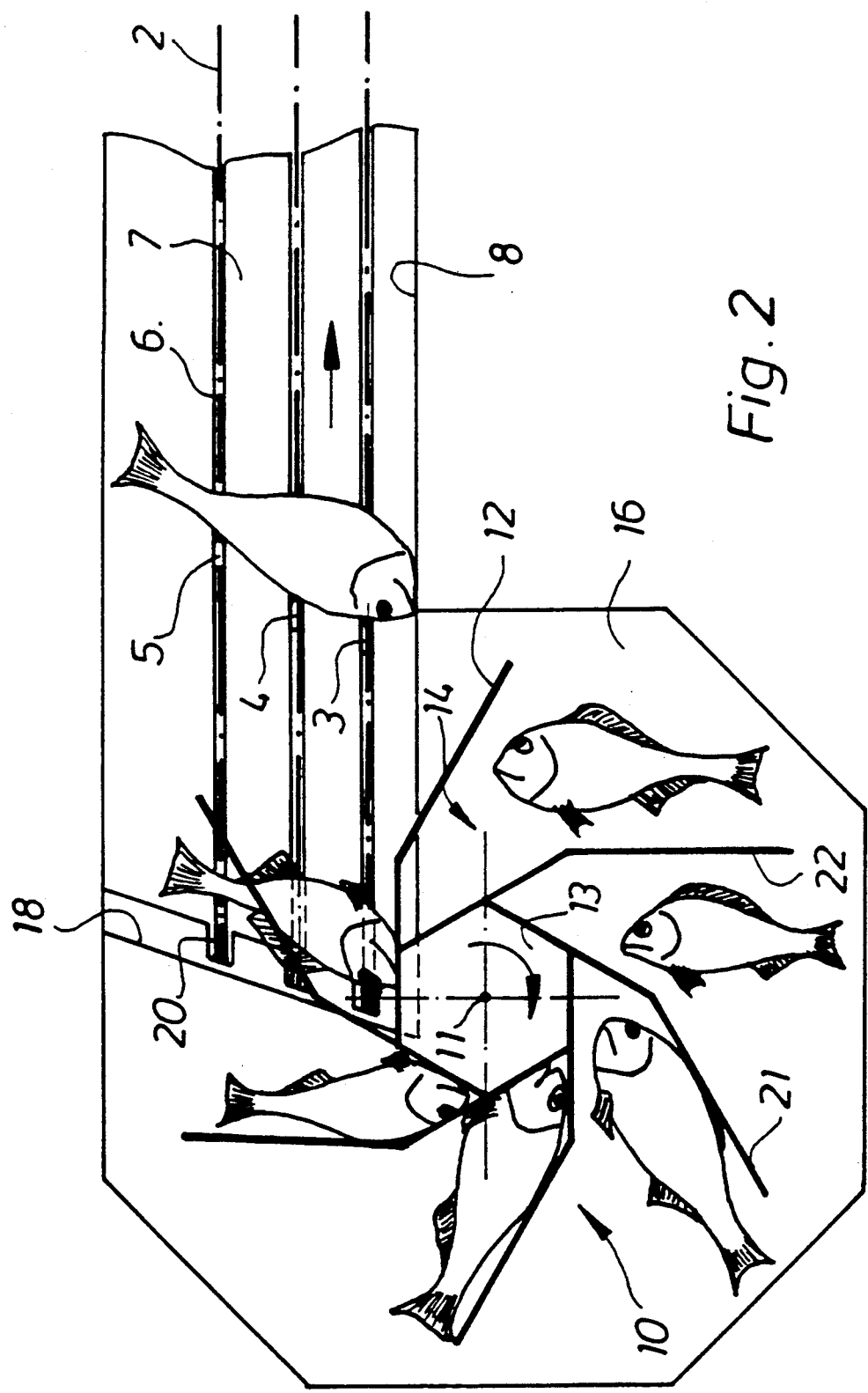
FIG. 2 shows a plan view of a modified arrangement of the apparatus shown in FIG. 1.

In the embodiment shown in FIG. 2 the direction of rotation of the rotary entraining table or spider 10 is vice versa, and the association of the feeding apparatus with the decapitating machine 1 is such that the engaging shoulder 8 extends approximately tangential with the hub body 13. In this embodiment, a bordering shoulder 15 such as shown in FIG. 1 may be omitted.

The function of the apparatus according to the invention is as follows:

With regard to the embodiment shown in FIG. 1, the fish to be processed are fed or introduced into the chambers 14 with their tail directed towards the revolving centre of the rotary entraining table 10, depending on the structure of the processing machine to be supplied, with either their back or their belly facing the advancing face 21 of the entraining elements 12. This feeding may occur, in practice, by throwing the fish into the chambers 14, since an exact positioning of the fish inside the chamber 14 is not necessary. This precise positioning occurs automatically in the course of the advancing of the fish towards the cut-out 17 in that the fish is retained by the friction which is effective between the fish and the stationary supporting surface 16, and in that the fish is thus advanced outwardly also in connection with the tangential alignment of the entraining elements 12. Consequently, the fish comes into engagement with the bordering should 15 with its mouth before it arrives in the region of the cut-out 17, so that the delivery to the conveyor 2 occurs in a uniform position of the mouth of the fish. The delivery or transfer then occurs by pushing the fish over the edge 18, and due to the utilized geometry of the cut-out 17 this occurs such that the tail part of the fish passes the edge 18 first. The fish thus arrives on the supporting face 7 of the conveyor 2 of the processing machine 1 where it is engaged from behind by the entrainers 3, 4 and 5 and is advanced towards processing.

In the embodiment shown in FIG. 2 the fish are fed into the chambers 14 with their mouth directed towards the centre of rotation of the rotary entraining table 10. Due to their contact with the entraining elements 12 the fish are advanced towards the centre of rotation of the rotary entraining table 10 and finally come into engagement with their mouth in the angle between one side face of the hub body 13 and the trailing entraining element 12. This occurs accurately before arriving at the edge 18 of the cut-out 17, so that the transfer of the fish to the conveyor 2 occurs in a uniform position.

What is claimed is:

1. A feeding apparatus for the timed feeding of fish into fish processing machines comprising at least one processing station such as a decapitating device and conveying means, which conveying means are equipped with at least one of receiving troughs or entrainers and supply the fish to at least one processing station, wherein said feeding apparatus is adapted to be arranged above said conveying means and comprises a supporting surface for said fish, rotary entraining table means arranged above said supporting surface, driven to rotate about an axis perpendicular to said supporting surface and having entraining elements forming outwardly directed and sector-shaped chambers, said supporting surface having a cut-out in an area above said conveying means and limited by an edge extending essentially in a radial direction with regard to said axis.

2. A feeding apparatus as claimed in claim 1, which further comprises a central hub body driven to rotate about said axis wherein said entraining elements are arranged on said central hub body to extend therefrom and to form tangents to said hub body.

3. An apparatus as claimed in claim 2, wherein said hub body is designed to form a rectilinear and regular prism defining side surfaces, said the entraining elements being arranged such that they extend outwardly in planes defined by said side surfaces.

4. An apparatus as claimed in claim 1, wherein each one of said entraining elements has a first face which is directed outwardly with regard to the centre of said rotary entraining table means, the revolving of said rotary entraining table means occurring in a manner that said first face is leading.

5. An apparatus as claimed in claim 2, wherein each one of said entraining elements has a first face which is directed outwardly with regard to the centre of said rotary entraining table means, the revolving of said rotary entraining table means occurring in a manner that said first face is leading.

6. An apparatus as claimed in claim 3, wherein each one of said entraining elements has a first face which is directed outwardly with regard to the centre of said rotary entraining table means, the revolving of said rotary entraining table means occurring in a manner that said first face is leading.

7. An apparatus as claimed in claim 1, wherein each one of said entraining elements has a second face which is directed inwardly with regard to the centre of said rotary entraining table means, the revolving of said rotary entraining table means occurring in a manner that said second face is leading.

8. An apparatus as claimed in claim 2, wherein each one of said entraining elements has a second face which is directed inwardly with regard to the centre of said rotary entraining table means, the revolving of said rotary entraining table means occurring in a manner that said second face is leading.

9. An apparatus as claimed in claim 3, wherein each one of said entraining elements has a second face which is directed inwardly with regard to the centre of said rotary entraining table means, the revolving of said rotary entraining table means occurring in a manner that said second face is leading.

10. An apparatus as claimed in claim 4, wherein a bordering shoulder is provided closing said chambers along their outer side.

11. An apparatus as claimed in claim 6, wherein a bordering shoulder is provided closing said chambers along their outer side.

12. An apparatus as claimed in claim 10, wherein said bordering shoulder is arranged stationary and interrupted in the area of said cut-out.

13. An apparatus as claimed in claim 11, wherein said bordering shoulder is arranged stationary and interrupted in the area of said cut-out.

14. An apparatus as claimed in claim 4, wherein said entraining elements each are designed with a concave contour along said face engaging the fish in a pushing manner.

15. An apparatus as claimed in claim 6, wherein said entraining elements each are designed with a concave contour along said face engaging the fish in a pushing manner.

16. An apparatus as claimed in claim 7, wherein said entraining elements each are designed with a concave contour along said face engaging the fish in a pushing manner.

17. An apparatus as claimed in claim 9, wherein said entraining elements each are designed with a concave contour along said face engaging the fish in a pushing manner.

18. An apparatus as claimed in claim 10, wherein said entraining elements each are designed with a concave contour along said face engaging the fish in a pushing manner.

19. An apparatus as claimed in claim 12, wherein said entraining elements each are designed with a concave contour along said face engaging the fish in a pushing manner.

20. An apparatus as claimed in claim 13, wherein said entraining elements each are designed with a concave contour along said face engaging the fish in a pushing manner.

* * * * *